Patented Dec. 30, 1941

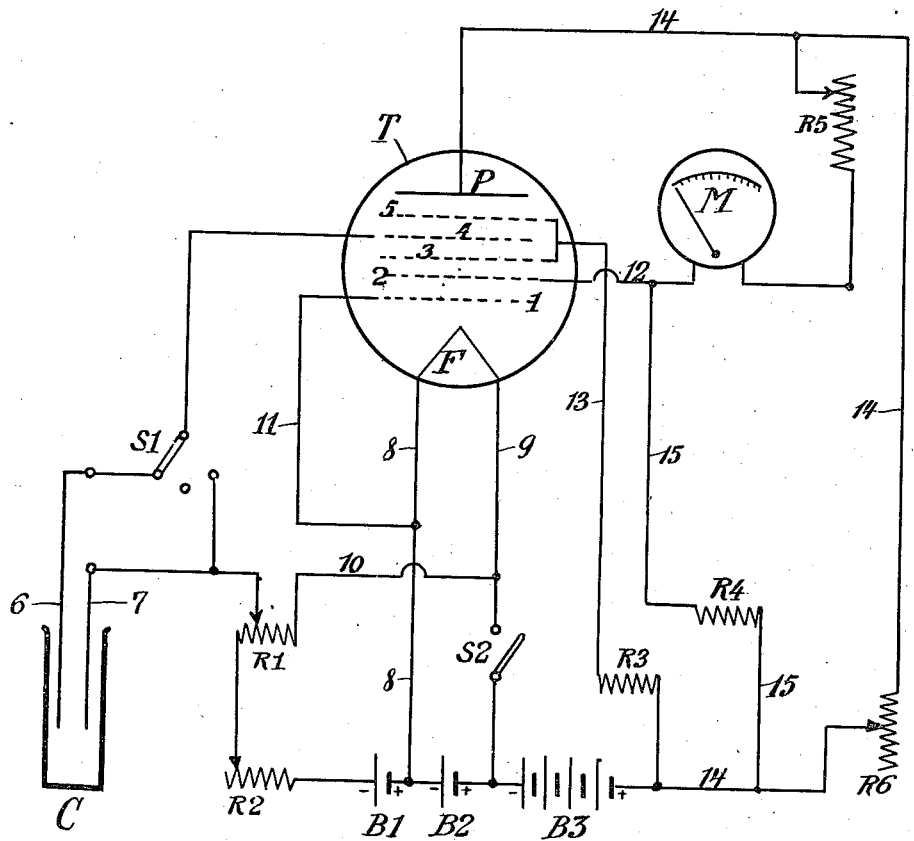

2,267,820

UNITED STATES PATENT OFFICE 2,267,820

VACUUM TUBE VOLTMETER CIRCUIT

Marcel E. Droz, New York, and Raymond L. Garman, Elmhurst, N. Y., assignors, by mesne assignments, to E. Leitz, Inc., a corporation of New York Application May 8, 1940, Serial No. 333,924

6 Claims. (Cl. 171—95)

This invention relates to voltmeters particularly battery operated vacuum tube voltmeters for use in electrometrical titrations. The invention provides a novel vacuum tube voltmeter circuit for the detection and measurements of low direct current potentials such as are produced in the course of electrometric titration. The use of the invention is not limited to electrometric titration processes but it may used for other purposes. For instance it may be used as a P. H. meter or a general electron tube for the measurement of voltages from any source.

The object of the invention is to provide a novel and improved vacuum tube voltmeter circuit employing a single vacuum tube, capable of being battery operated and having an unusually low current drain thereby eliminating frequent battery replacement, yet possessing high stability and sensitivity, low tube grid currents, simplicity of design, relatively inexpensive to manufacture and easy to operate.

These objects are accomplished by a novel voltmeter circuit according to our invention. The circuit makes use of a pentagrid converter tube of the type known in the art as a 1A7G tube or other tubes of this type. With such a tube excellent results may be expected. Such tubes are used in the field of radio communication for the purpose of mixing a generated signal of a given frequency with a signal of another frequency and they are characterized by the fact that the electron emission current flowing through the tube from the filament to the plate and through the so called oscillator anode is controlled by the control grid within the tube so that ordinarily the effect of imposing an increasingly negative D. C. potential on the control grid is to decrease the plate current and which also reduces the translational gain of the tube.

We have discovered that such a tube may be used for the measurement of small D. C. potentials of the order of millivolts which are commonly encountered in electro-chemical phenomena in general and more specifically in electrometric titrations and electrode potentials measurements. However, ordinarily, if these tubes were to be used for the measurements of small D. C. voltages one would connect the oscillator anode to the plate or the oscillator anode would be disregarded altogether. In either case the tube would be converted into an equivalent pentode of low mutual conductance and amplification factor. However, we have also discovered that when this type of tube is connected in our circuit an increasing negative potential on the control grid has but little effect on the electron emission current. The principal effect is that of changing the partitioning ratio of the current between the oscillator anode and the plate which results in a decrease in plate current with a simultaneous increase in oscillator anode current. If an A. C. signal were to be placed on the control grid it would result in plate and oscillator signals approximately 180 degrees out of phase.

By connecting the tube in a circuit according to our invention an instrument is obtained in which the effective current or voltage amplification of the input voltage will be approximately double that of prior circuits for the same current consumption without sacrificing other essential features such as low grid currents, and simplicity of construction. Consequently for a given sensitivity this instrument will consume only half the current of previous circuits resulting in long battery life.

Our novel circuit is illustrated in the accompanying drawing which is a wiring diagram of the circuit. In the drawing the vacuum tube is designated T and is a tube of the type known as 1A7G but may be any other equivalent type which contains a filament F, a plate P and five grids marked 1-5 and known as oscillator grid, oscillator anode, screen grid, control grid and screen grid in the order numbered. The batteries are marked as follows. B1 is a biasing battery. B2 is the filament battery and B3 the plate battery. M is a voltmeter. C is the titration cell with the two electrodes 6 and 7. S1 and S2 are switches. The wiring connections are as follows. The one electrode 6 is connected to the control grid 4 through the switch S1. The other electrode 7 is connected through variable resistances R1 and R2 to one side of battery B1. The batteries are all connected in series. Between batteries B1 and B2 a wire 8 leads to the filament F which is connected back to batteries by a wire 9 through the other switch S1. Resistance R1 and switch S2 are connected by wire 10. Oscillator grid 1 is connected by wire 11 to the negative end of the filament. The two screen grids 3 and 5 are connected by a wire 13 and resistance R3 to a wire 14 which connects the battery B3 to the plate P through a variable resistance R6. One side of meter M is connected to the oscillator anode grid 2 by means of wire 12. A variable resistance R5 is connected between the other side of the meter and the plate. Another resistance R4 is connected by wire 15 to the meter and to battery B3.

The operation is as follows. When the apparatus is to be used as a titrimeter the cell C is connected as shown. Switch S2 is closed to connect battery B2 with the filament F to heat the filament. Switch S1 is now closed on contact *a* leaving the control grid 4 in a free position. Variable resistance R6 is now adjusted until meter M reads any value of current between zero and maximum. Some of the electron current passes from the filament F through the various grids to plate P then via wire 14 and through resistance R6 to the battery. Some electron current also passes from the filament to the oscillator anode 2, thence by wire 15 through resistance R4 to the battery. If now the IR drop of the first current through resistance R6 should be higher than the IR drop of the second current through the wire 15 through the resistance R4, then some current will flow through the meter M in an amount necessary to again establish equilibrium. Switch S1 is now moved to contact *c* thus connecting the electrodes in the control grid circuit. Variable resistance R1 which changes the grid bias is then adjusted until meter M reads approximately zero and R2 which is merely a fine control for R1 is then adjusted until the meter reads exactly zero.

The solution in cell C is now titrated causing the potential across the electrodes 6 and 7 to change with the addition of the reagent. The difference in potential between the value existing at the beginning of the titration process and the potential existing at the end of any given addition of reagent can be determined from the reading of the meter.

The end-point of the titration is determined by the usual methods, that is it corresponds to the volume of reagent added where the potential of the cell changes most per unit volume of reagent added and in this particular instance to where the meter deflection changes most per unit volume of reagent added. Since the difference of potential in the cell before and after titration is dependent upon the solution in the cell, the electrodes and the reagent being added, the apparatus has been provided with a sensitivity control R5 which should be adjusted for any particular titration to such a position that after the titration is over the meter M will be reading approximately full scale. This position can only be determined by an actual trial but once found it will insure maximum sensitivity and convenience in carrying out the titration. Ordinarily, as mentioned in the foregoing one would expect that the control grid 4, when made increasingly negative, would result in a decrease of electron emission current and in turn cause a reduction of current in all collecting anodes, in this instance the oscillator anode grid 2 and the plate P. However, with a tube connected as described the control grid 4 has but little effect on the total electron emission current. Instead, it partitions the ratio of current between the plate and the oscillator anode grid 2 which results in a decrease in plate current and a simultaneous increase in oscillator anode current causing the meter to deflect. The deflection is a measure of the change of both circuits. In this manner M gives twice the deflection for a given current passing through the cathode than could be secured by the use of this type of vacuum tube in any other circuit or by the use of any other types of existing tubes.

If it is desired to use the circuit as a voltmeter then the operation is as follows: The unknown potential to be measured is connected across the binding posts with the proper polarity the same as the electrodes 6 and 7. Switch S2 is closed to allow current from battery B2 to pass to the filament to heat the same. Switch S1 is now moved to contact *b* which is equivalent to having zero potential across the terminals of the unknown potential. The grid bias variable resistance R1 and its fine control resistance R2 are adjusted until the meter reads exactly zero. Switch S1 is now moved to contact *c* thus connecting the unknown potential to the circuit. The reading of the meter will now be proportional to the unknown potential. The sensitivity of the meter is of course still controlled by R5. The advantage and utility of this circuit is that one may obtain an adequate sensitivity with a very low anode battery drain. This is an important practical advantage and feature of this invention.

In the foregoing description and in the drawing we have disclosed the use of a selected vacuum tube containing five grid elements which have been given conveniently selected names to indicate their characteristics and functions in the circuit. However, it should be understood that the invention is not limited to the use of the particular tube described and shown. Other tubes may be used. It should be noted that while it is advisable and preferable to connect the oscillator grid 1 to some point of definite potential with respect to the filament, such a connection, as for instance indicated at 11 in the drawing, is not essential. Even when the oscillator grid 1 is left disconnected and permitted to seek its free grid potential the circuit will operate as described. On the other hand a tube may be selected which does not contain an oscillator grid. In that case the circuit will also function as described provided the disposition of the elements within the tube be such as to function in accordance with the principle of the invention. That is to say, the elements must be disposed so as to yield a partitioning of the total anode current between the two collecting elements, the plate and the grid 2, and such partitioning must be a function of the voltage between two other elements of the tube, the control grid and the filament.

We claim:

1. A vacuum tube voltmeter circuit for detecting and measuring low direct current potentials comprising a vacuum tube having a filament and a plate, an oscillator grid, an oscillator anode grid, screen grids and a control grid between said filament and plate; a heater battery connected to said filament, a plate battery, a connection including a variable resistance between said plate and the positive terminal of the plate battery, a connection including a resistance between said anode grid and the positive terminal of the plate battery, a voltmeter connected across the plate and said anode grid, a connection between said screen grids and the plate battery, the negative terminal of the plate battery being connected to the positive terminal of the heater battery, a connection between said oscillator grid and the filament, and means for connecting the terminals of potentials to be measured between said control grid and the filament.

2. A vacuum tube voltmeter circuit for detecting and measuring low direct current potentials comprising a vacuum tube having a filament and a plate, an oscillator grid, an oscillator anode grid, screen grids and a control grid between said filament and plate; a heater battery connected to said filament, a plate battery, a connection including a variable resistance between said plate and the positive terminal of the plate battery, a connection including a resistance between said anode grid and the positive terminal of the plate battery, a voltmeter connected across the plate and said anode grid, a connection including a resistance between said screen grids and the plate battery, the negative terminal of the plate battery being connected to the positive terminal of the heater battery, a connection between said oscillator grid and the filament, and means for connecting the terminals of potentials to be measured between said control grid and the filament.

3. A vacuum tube voltmeter circuit for detecting and measuring low direct current potentials comprising a vacuum tube having a filament and a plate, an oscillator grid, an oscillator anode grid, screen grids and a control grid between said filament and plate; a heater battery connected to said filament, a plate battery, a connection including a variable resistance between said plate and the positive terminal of the plate battery, a connection including a resistance between said anode grid and the positive terminal of the plate battery, an ammeter with variable series resistance connected across the plate and said anode grid, a connection including a resistance between said screen grids and the plate battery, the negative terminal of the plate battery being connected to the positive terminal of the heater battery, a connection between said oscillator grid and the filament, and means for connecting the terminals of potentials to be measured between said control grid and the filament.

4. A vacuum tube voltmeter circuit for detecting and measuring low direct current potentials comprising a vacuum tube having a filament and a plate, an oscillator grid, an oscillator anode grid, screen grids and a control grid between said filament and plate; a heater battery connected to said filament, a plate battery, a connection including a variable resistance between said plate and the positive terminal of the plate battery, a connection including a resistance between said anode grid and the positive terminal of the plate battery, an ammeter with variable series resistance connected across the plate and said anode grid, a connection including a resistance between said screen grids and the plate battery, the negative terminal of the plate battery being connected to the positive terminal of the heater battery, a connection between said oscillator grid and the filament, and means for connecting the terminals of potentials to be measured between said control grid and the filament, and means for biasing the control grid.

5. A vacuum tube voltmeter circuit for detecting and measuring low direct current potentials comprising a vacuum tube having a filament and a plate, an oscillator grid, an oscillator anode grid, screen grids and a control grid between said filament and plate; a heater battery connected to said filament, a plate battery, a connection including a variable resistance between said plate and the positive terminal of the plate battery, a connection including a resistance between said anode grid and the positive terminal of the plate battery, an ammeter with variable series resistance connected across the plate and said anode grid, a connection between said screen grids and the plate battery, the negative terminal of the plate battery being connected to the positive terminal of the heater battery, a connection between said oscillator grid and the filament, and means for connecting the terminals of potentials to be measured between said control grid and the filament and means for biasing the control grid.

6. A vacuum tube voltmeter for detecting and measuring low direct current potentials comprising a vacuum tube having a plate, an emitting element and a plurality of vacuum tube grid elements therebetween, said grid elements including a collecting grid element and a control grid element so disposed as to yield a partitioning of the total anode current between said plate and said collecting grid element, which partitioning is a function of the voltage between said emitting element and said control grid element, a plate battery, a connection including a variable resistance between said plate and the positive terminal of the plate battery, a connection between said collecting grid element and the positive terminal of the plate battery, the negative terminal of the plate battery being connected to said emitting element, means for connecting the terminals of potentials to be measured between said control grid element and the said emitting element, and a voltmeter connected across the plate and said collecting grid element to indicate the measurements of potentials.

MARCEL E. DROZ.
RAYMOND L. GARMAN.